April 18, 1950
G. E. REINKER
2,504,586
ELECTRIC LAMP BASE
Filed April 14, 1948
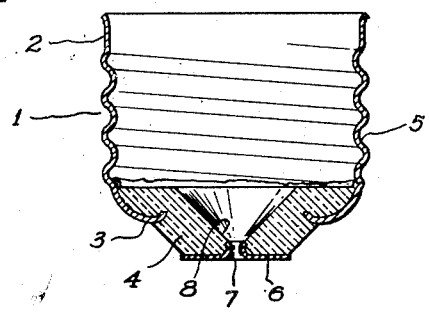
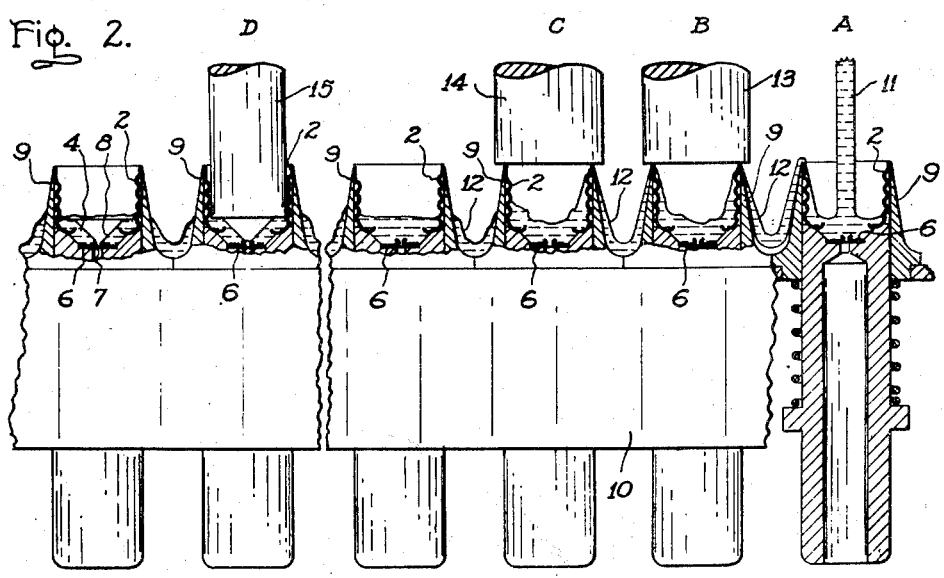
Inventor:
Gerald E. Reinker,
by Vernet C. Kauffman
His Attorney.

Patented Apr. 18, 1950

2,504,586

UNITED STATES PATENT OFFICE 2,504,586

ELECTRIC LAMP BASE

Gerald E. Reinker, Cleveland, Ohio, assignor to General Electric Company, a corporation of New York Application April 14, 1948, Serial No. 21,036

4 Claims. (Cl. 176—32)

My invention relates to electric lamp bases of the type comprising a relatively thin metal shell having a glass body or insulator molded thereon. More particularly, my invention relates to the glass insulation of such type lamp bases.

Electric lamp bases of the type comprising a thin metal shell, usually of brass, having a glass body or insulator button molded onto one end thereof, are generally made at present by inserting the brass shell in a metal mold, introducing a charge of molten glass into the mold, pressing the charge of glass into shape by means of a forming plunger, cleaning the glass from the base eyelet hole by means of a pin plunger, and then ejecting the base from the mold onto a cooling belt after the glass has cooled sufficiently to retain its shape.

After the bases are ejected from the molds of the glass filling machine, the ideal condition would be to give the glass a thorough annealing in order to relieve the internal strains therein and thus minimize cracking and breakage of the glass which, heretofore, have been responsible for a relatively high percentage of rejects, especially in the case of the larger-sized lamp bases. Such an annealing of the glass, however, is impracticable because the brass shells would then also become annealed along with the glass and, as a result, would lose most of their strength or resistance to crushing. The general practice, therefore, in base making has been to rapidly cool the base to room temperature so as to prevent any such substantial annealing of the brass shell. But while the brass shell is not substantially annealed when the base is thus cooled rapidly, neither is the glass annealed, as a consequence of which the glass is left in a highly strained condition such as results in considerable cracking and breakage of the glass, especially in the large-sized bases, and therefore a relatively high percentage of rejects or "shrinkage," as it is called, from cracked and broken glass insulation.

The above-mentioned difficulty could be partially overcome either by using thicker brass for the brass shell, which would then allow the base to be thoroughly annealed while retaining sufficient shell strength, or by using a low-expansion type glass which would withstand quick cooling without cracking, but in both cases the increase in cost would more than offset any savings gained by a reduction in the percentage of rejects from cracked or broken glass. Thus, there has always been a search for a glass for lamp bases which would be less subject to cracking and still not increase the cost of base manufacture beyond the possible savings to be realized from a reduction in cracked or broken glass.

It is one object of my invention, therefore, to provide an electric lamp base of the character described which is considerably less subject to cracking and breakage of the glass insulation provided thereon and which is of greatly improved quality as compared to previous types heretofore in general use.

Another object of my invention is to provide an electric lamp base which can be manufactured not only with greatly improved quality and reduced shrinkage from cracking of the glass insulation provided thereon, but also at substantially the same or lower cost over previous types.

Further objects and advantages of my invention will appear from the following description of a species thereof and from the accompanying drawing in which:

Fig. 1 is a sectional view of an electric incandescent lamp base according to the invention, and Fig. 2 is a fragmentary elevation, partly in section, of the rotary mold carrier of a machine for making the lamp base comprising my invention, the molds being shown in linearly rather than in circularly arranged relation in order to better illustrate the steps in the manufacture of the base according to the method of my invention.

Referring to Fig. 1, the lamp base 1 according to the invention comprises a tubular, relatively thin metal shell 2 preferably formed of brass and having a wall thickness ranging from about 0.005 to 0.011 inch, depending upon the type and size of the base. Thus, for a base of the type commercially known as a medium screw base the wall thickness ranges between about .005 to .006 inch, while for the larger-size bases, such as that known as a mogul base, a greater wall thickness ranging up to about .011 inch is employed. The shell 2 is provided at one end with an inturned flange 3 onto which is molded a glass body or insulator button 4 closing the said end of the shell. The particular base 1 illustrated is of the screw-threaded type wherein the shell 2 is provided with external screw threads 5 to enable screwing of the base into a screw-threaded lamp socket. The base 1 may be provided further with one or more end contacts or eyelets 6 carried by the insulator button 4 and having an aperture 7 through which a lead-in wire of an electric lamp may be threaded and soldered or otherwise secured to the end contact, the insulator button 4 being also provided for such purpose with an aperture 8 connecting with the end contact aperture 7.

In the manufacture of the lamp base 1 in accordance with the method comprising the invention, the shell 2 and the eyelet 6 are inserted in an upwardly-opening cavity of a mold 9 which is adapted to hold the shell and eyelet in proper molding relation with each other, as shown in Fig. 2. The mold 9 is carried by a rotary carrier or turret 10 forming part of a conventional type base-making machine. The turret 10 is provided with a plurality of such molds 9 circularly arranged about its periphery, and it is intermittently rotated or indexed to position each mold 9 successively at various operating stations of the machine. The turret 10 first presents the mold 9 to suitable feeding devices where the base shell 2 and eyelet 6 are inserted into the mold, after which the mold is carried beneath a continuously falling stream 11 of molten glass, of a composition according to the invention, to receive a given charge of such molten glass therein. From the glass filling station A (Fig. 2) the mold 9 is then indexed to stations B and C where the glass threads 12, which are laid between adjacent molds as they index to and away from the glass filling station A, are severed at the projecting rim of the base shell 2 by vertically reciprocating cutters 13, 14 which move down against the rim or edge of the base shell to thereby squeeze and sever the glass threads 12 at such points. From the glass thread severing stations B and C, the mold 9 is then carried through a number of idle stations to allow the molten glass in the mold 9 to settle down into the bottom thereof, after which the mold is then carried to one or more glass-forming stations D where a vertically reciprocating forming plunger 15 moves down into the base shell 2 and compresses the molten glass therein to thus form and shape the glass web or button 4 of the base. The perforation 7 in the base eyelet 6 is subsequently cleared of glass at one of the ensuing index stations of the turret by means of a vertical reciprocating punch (not shown), after which the completed base is finally ejected from the mold 9 onto a cooling belt where it is rapidly cooled at a rate controlled to "fit" the brass shell, so to speak, whereby to obtain the minimum possible strain in the glass while preventing substantial shell annealing and thus preserving the strength of the brass shell above a certain prescribed minimum limit. Such controlled cooling of the base to prevent substantial annealing of the brass shell may require either a partial reheating of the base or forced cooling thereof, depending on the particular type and size of base involved. In the majority of cases, however, as with the particular base illustrated, forced cooling is required, such as by a blast of cooling air directed against the base while it is carried along on the cooling belt.

The glass 11 employed for the base 1 is of the type known in the art as a "soft" glass, usually a soda-lime glass, having a relatively high expansion coefficient ranging from approximately 85 to 95 × $10^{-7}$, as contrasted to the relatively low expansion or "hard" glasses which have expansion coefficients around 32 to 37 × $10^{-7}$. So far as known, the high-expansion glass heretofore used for lamp base manufacture has always been made by remelting scrap glass, known as cullet, and adding manganese dioxide thereto to color the glass. The percentage of manganese dioxide required varies according to the type of cullet used, conventional bottle cullet usually requiring the addition of from 4 to 6 per cent manganese to impart a good color to the final glass while scrap lamp-bulb cullet requires only about 2 per cent manganese for a good color. The reason for the difference in the amount of manganese required for bottle cullet and bulb cullet is that the bottle cullet generally contains a considerable amount of carbonaceous matter in the form of dirt, and also carbon which is contained in carbon amber-colored bottles. This carbon reduces the managanese dioxide to a lower state of oxidation which is colorless, as a result of which more manganese is required to maintain a color and keep the glass from coming out clear. Representative composition ranges of bottle cullet and glass cullet as used in the manufacture of lamp bases in accordance with the invention are as follows:

|  | Bottle Cullet | Bulb Cullet |
|---|---|---|
|  | Per cent | Per cent |
| $SiO_2$ | 71.0–74.0 | 71.0–74.0 |
| $Al_2O_3$ | 0.5–2.0 | 0.8–2.0 |
| BaO | 0.0–0.5 | 0.0–0.0 |
| CaO | 5.0–11.0 | 4.5–8.0 |
| MgO | 0.0–5.0 | 3.0–4.0 |
| $Na_2O$ | 13.0–16.0 | 16.0–17.4 |
| $K_2O$ | 0.3–0.6 | 0.1–0.6 |
| $B_2O_3$ | 0.0–1.0 | 0.0–1.0 |
| $SO_3$ | 0.1–0.4 | 0.1–0.4 |

The reason for the coloring of the glass used in lamp bases is for appearance only. Clear glass would serve the purpose equally as well but would not conceal the defects in the glass and the basing cement of the finished electric lamp, nor would a clear glass provide as good a color contrast with the shiny brass shell of the base.

It is known that glasses colored with different oxides have different rates of infrared transmissions at elevated temperatures (500° C. or higher) than at room temperatures. Also, the visible color of the glass or intensity of color at room temperature is no indication of what the infrared transmission would be at 500° C. or above. It is through the application of this knowledge that I have discovered that glasses colored with cobalt oxide can be molded into lamp bases and be cooled quickly with fewer cracks and breakage than a glass colored with manganese. Glass colored with cobalt is more transparent to infrared rays than manganese glasses, at high temperatures. Because of this fact, the heat in the pressed piece of cobalt oxide colored glass is able to distribute itself more readily throughout the glass body, thus resulting in less strain in the glass when cooled quickly without any subsequent annealing. This effect is obtained even though the glass at room temperature is of the same visible intensity of color to the eye. The only noticeable difference between the two glasses is that on reflected light the cobalt glass has a blue tint while the manganese glass has a purple tint.

In accordance with the invention, the amount of cobalt oxide present in the final glass composition may range from approximately .03 to approximately 1 per cent by weight. Preferably, however, the amount of cobalt oxide is kept as low as possible while still imparting satisfactory color to the glass. Thus, a satisfactory color can be obtained with approximately .062 per cent of cobalt oxide present in the glass composition. The approximate composition range of a representative glass 11 according to the invention is as follows:

| | Per cent | | Per cent |
|---|---|---|---|
| $SiO_2$ | 65.0–73.0 | $Na_2O$ | 13.0–19.0 |
| $Al_2O_3$ | 0.5– 2.0 | $K_2O$ | 0.1– 0.6 |
| BaO | 0.0– 0.5 | $B_2O_3$ | 0.0– 2.0 |
| CaO | 4.0–11.0 | CoO | 0.3– 1.0 |
| MgO | 0.0– 2.5 | | |

On the basis of present prices of material, the cost of coloring glass made from bulb cullet with cobalt oxide is approximately the same as with manganese. However, for coloring glasses made from old bottle cullet, the use of cobalt oxide is considerably cheaper than manganese. This is due to the fact that cobalt oxide, unlike manganese dioxide, is not reduced to a lower state of oxidation such as to lose its color, and therefore a minimum amount of cobalt oxide can be used. A further advantage in the use of cobalt oxide as a coloring agent is that the quantity required is very small, only 1¼ pounds or so being required for a ton of glass cullet, as compared to manganese dioxide which requires up to 120 pounds per ton of glass cullet. This results in less material storage space and less labor for handling. Also, because of the very dusty character of the manganese dioxide, the mixing of the required large quantities of manganese dioxide covers the factory with black dust. This condition is not prevalent with the use of cobalt oxide.

By the use of the glass composition in accordance with the invention, cracked or broken glass in the bases as manufactured has been substantially eliminated, and a much better quality base produced at equal or lower cost. Besides materially reducing the manufacturing shrinkage from cracked and broken glass, the minimization of the strains in the glass insulation 4 obtained through the use of the glass composition according to the invention also lessens the likelihood of the glass cracking and breaking during subsequent handling of the finished base, or during the incorporation thereof into an electric lamp.

What I claim as new and desire to secure by Letters Patent of the United States is:

1. An electric lamp base comprising a relatively thin metal shell, and a colored glass body molded onto said shell and consisting of a high-expansion high heat-transmissive glass containing a small amount of cobalt oxide as a coloring agent.

2. An electric lamp base comprising a relatively thin metal shell, and a colored glass body molded onto said shell and consisting of a high-expansion high-heat-transmissive glass containing from approximately .03 to 1 per cent of cobalt oxide as a coloring agent.

3. An electric lamp base comprising a relatively thin brass shell, and an unannealed colored glass body molded onto said shell and consisting of a high-expansion high heat-transmissive glass containing a small amount of cobalt oxide as a coloring agent.

4. An electric lamp base comprising a relatively thin brass shell, a metal end contact, and an unannealed colored glass insulator molded onto and insulatively inter-connecting said shell and end contact, said insulator consisting of a high-expansion high heat-transmissive glass containing from approximately .03 to 1 per cent of cobalt oxide as a coloring agent.

GERALD E. REINKER.

REFERENCES CITED

The following references are of record in the file of this patent:

UNITED STATES PATENTS

| Number | Name | Date |
| --- | --- | --- |
| 796,470 | Swan | Aug. 8, 1905 |
| 905,478 | Swan | Dec. 1, 1908 |
| 1,706,880 | Gustin | Mar. 26, 1929 |
| 1,865,468 | Gustin | July 5, 1932 |
| 2,159,812 | Malloy | May 23, 1939 |

OTHER REFERENCES

Textbook of Glass Technology, Hodkin and Cousin, 1925, published by Van Nostrand Co., N.Y., pp. 117 and 118.

Certificate of Correction

Patent No. 2,504,586 April 18, 1950

GERALD E. REINKER

It is hereby certified that error appears in the printed specification of the above numbered patent requiring correction as follows:

Column 4, line 74, for "0.3– 1.0" read *0.03– 1.0*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*